US010928937B2

(12) United States Patent
Fang et al.

(10) Patent No.: US 10,928,937 B2
(45) Date of Patent: Feb. 23, 2021

(54) TOUCH PANEL AND SHEET OF TOUCH SENSORS

(71) Applicant: TPK Glass Solutions (Xiamen) Inc., Xiamen (CN)

(72) Inventors: Wei-Chia Fang, Hsinchu (TW); Chung-Chin Hsiao, Hsinchu (TW)

(73) Assignee: TPK Glass Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 16/254,602

(22) Filed: Jan. 23, 2019

(65) Prior Publication Data

US 2019/0227647 A1 Jul. 25, 2019

(30) Foreign Application Priority Data

Jan. 24, 2018 (CN) .......................... 201810066867.5

(51) Int. Cl.
*G06F 3/041* (2006.01)
*G06F 3/044* (2006.01)

(52) U.S. Cl.
CPC ............ *G06F 3/041* (2013.01); *G06F 3/0443* (2019.05); *G06F 3/0445* (2019.05); *G06F 3/0446* (2019.05); *G06F 3/0448* (2019.05); *G06F 3/04164* (2019.05); *G06F 2203/04103* (2013.01); *G06F 2203/04107* (2013.01)

(58) Field of Classification Search
CPC .... G06F 3/0443; G06F 3/0445; G06F 3/0446; G06F 3/0448; G06F 3/041; G06F 3/04164; G06F 2203/04107; G06F 2203/04103
See application file for complete search history.

(56) References Cited

U.S. PATENT DOCUMENTS

| 8,723,046 | B2 | 5/2014 | Hashimoto et al. | |
| 9,060,429 | B2* | 6/2015 | Nagaoka | H05K 1/0269 |
| 9,830,033 | B2* | 11/2017 | Son | G06F 3/044 |
| 10,192,651 | B2* | 1/2019 | Kanna | C08G 18/673 |
| 2012/0319980 | A1* | 12/2012 | Nagaoka | H05K 1/0269 345/173 |
| 2016/0320876 | A1* | 11/2016 | Son | G06F 3/044 |
| 2019/0227650 | A1* | 7/2019 | Fang | G06F 3/044 |

FOREIGN PATENT DOCUMENTS

| CN | 102778983 A | 11/2012 |
| CN | 102947781 A | 2/2013 |
| CN | 104423711 A | 3/2015 |
| CN | 103119542 B | 8/2016 |
| TW | 201715358 A | 5/2017 |

* cited by examiner

*Primary Examiner* — Vijay Shankar
(74) *Attorney, Agent, or Firm* — Cooper Legal Group, LLC

(57) ABSTRACT

A touch panel includes: a substrate, peripheral wires, marks, first coverings, and second coverings. The peripheral wires are disposed on the substrate, and each of the peripheral wires has a sidewall and a top surface. The marks are disposed on the substrate, and each of the marks has a sidewall and a top surface. The first coverings cover the top surfaces of the peripheral wires, and the second coverings cover the top surfaces of the marks, wherein the first coverings and the second coverings include metal nanowires. Furthermore, a sheet of touch sensors is provided.

20 Claims, 9 Drawing Sheets

TOUCH PANEL AND SHEET OF TOUCH SENSORS

CROSS-REFERENCE TO RELATED APPLICATION

This application claims priority to china application serial number 201810066867.5, filed Jan. 24, 2018, which is herein incorporated by reference.

BACKGROUND

Technical Field

The present disclosure relates to a touch panel and a sheet of touch sensors.

Description of the Related Art

Transparent conductive materials have high transmission and provide good electrical conductivity, making them suitable for display devices and touch sensing panels. Examples of transparent conductive materials include various metal oxides, such as indium tin oxide (ITO), indium zinc oxide (IZO), cadmium tin oxide (CTO), and aluminum-doped zinc oxide (AZO). However, these metal oxides cannot satisfy the requirement for flexible display devices. Nanowires are one example of transparent conductive materials developed for flexible display devices.

When manufacturing a touch sensing electrode, a common component in touch sensing panels, to ensure proper alignment of a nanowire layer to a metal trace layer in a peripheral area, an alignment tolerance area is included in the peripheral area. If a roll-to-roll process is used to manufacture the touch sensing electrode, the size of the alignment tolerance area may be enlarged (e.g. to 150 μm) to account for potential deformation of the substrate.

BRIEF SUMMARY

In some embodiments of the present disclosure, a structure in which peripheral wires are at least covered by metal nanowires having desired patterns and marks is formed. Thus, there is no need for preserving the alignment tolerance area in the peripheral areas in an alignment step so as to decrease the size of the peripheral areas. Accordingly, the feature of the narrowed frame border is achieved. Further, in some embodiments of the present disclosure, a sheet of touch sensors is provided. In the sheet of touch panels comprises one or more kinds of marks, which usually are provided for demonstrating desired visual functions, and the marks are also covered by the metal nanowires having desired patterns.

According to some embodiments of the present disclosure, a touch panel includes: a substrate, a plurality of peripheral wires, a plurality of marks, a plurality of first coverings, a plurality of second coverings, and a touch sensing electrode. The substrate has a display area and a peripheral area. The peripheral wires are disposed on the substrate, and each of the peripheral wires has a sidewall and a top surface. The marks are disposed on the substrate, and each of the marks has a sidewall and a top surface. The first covering is formed on and covers the corresponding top surface of the peripheral wire, and the second covering is formed on and covers the corresponding top surface of the mark. In addition, the first coverings and the second coverings include metal nanowires. The peripheral wires, the marks, the first coverings, and the second coverings are located on the peripheral area of the substrate. The touch sensing electrode is located on the display area of the substrate, and the touch sensing electrode electrically connects the peripheral wires.

According to some embodiments of the present disclosure, the touch panel further includes a coating layer covering the touch sensing electrode, the first coverings, and the second coverings. The coating layer covers the entire of touch panel. Alternatively, the coating layer has a patterned structure to cover the touch sensing electrode, the first coverings, and the second coverings, and the non-conductive areas are exposed.

According to some embodiments of the present disclosure, the touch panel further includes non-conductive areas distributed in the display area and the peripheral area.

According to some embodiments, the non-conductive area has a filling layer made of a same material as the coating. Alternatively, the non-conductive area is a gap.

According to some embodiments of the present disclosure, each of the first coverings has a side surface, and the side surface and the corresponding sidewall of peripheral wire form a common etched surface. There is no metal nanowire protruding out of the side surface of the first covering.

According to some embodiments of the present disclosure, each of the second coverings has a side surface, and the side surface and the corresponding sidewall of mark form a common etched surface. There is no metal nanowire protruding out of the side surface of the second covering.

According to some embodiments of the present disclosure, no metal nanowires exist in the sidewall of the peripheral wires and the sidewall of the marks.

According to some embodiments of the present disclosure, the marks include bonding alignment marks.

According to some embodiments of the present disclosure, the width of the peripheral wire is in a range from 5 μm to 20 μm, and the distance between neighboring two peripheral wires is in a range from 5 μm to 20 μm.

According to some embodiments of the present disclosure, the peripheral wires and the marks are made of a metal material, and the touch sensing electrode is formed by patterning the metal nanowire layer so that the touch sensing electrode comprises the metal nanowires.

According to some embodiments of the present disclosure, a sheet of touch sensors includes a substrate and a plurality of touch panels formed thereon. Each of the touch panels includes a plurality of peripheral wires, a plurality of first coverings, and a touch sensing electrode. The peripheral wires are disposed on the substrate, and each of the peripheral wires has a sidewall and a top surface. The first covering is formed on and covers the corresponding top surface of the peripheral wire. In addition, the peripheral wires and the first coverings are located in a peripheral area of the touch panel. The touch sensing electrode is disposed on a display area, and the touch sensing electrode electrically connects the peripheral wires. The sheet also includes a plurality of marks and a plurality of second coverings. The marks are disposed on the substrate, and each mark has a sidewall and a top surface. The second covering is formed on and covers the corresponding top surface of the mark. The first coverings and the second coverings are formed by patterning the metal nanowire layer so that they both include metal nanowires.

According to some embodiments of the present disclosure, the sheet further includes a coating layer covering the touch sensing electrode, the plurality of first coverings, and the plurality of second coverings. The coating layer covers the entire of sheet.

Alternatively, the coating layer has a patterned structure to cover individual touch panels and the second coverings on the marks formed between the adjacent touch panels are exposed. In other words, there is no coating layer formed on the second coverings on the marks formed between the adjacent touch panels, and there is no coating layer formed on the surface of the un-functional areas of sheet between the adjacent touch panels.

Still alternatively, the coating layer has a patterned structure to cover individual touch panels and the second coverings on the marks formed between the adjacent touch panels. In other words, there is no coating layer formed on the surface of the un-functional areas of sheet between the adjacent touch panels.

Still alternatively, the coating layer, in each touch panel of the sheet, has a patterned structure to the touch sensing electrode, the first coverings, and the second coverings located in the peripheral area, and the non-conductive areas of the touch panel are exposed. The patterned coating layer also covers the second coverings on the marks formed between the adjacent touch panels.

According to some embodiments of the present disclosure, the sheet further includes non-conductive areas distributed in the display area and the peripheral area.

According to some embodiments of the present disclosure, the non-conductive area has a filling layer made of a same material as the coating. Alternatively, the non-conductive area is a gap.

According to some embodiments of the present disclosure, each of the first coverings has a side surface, and the side surface and the corresponding sidewall of the peripheral wire form a common etched surface. There is no metal nanowire protruding out of the side surface of the first covering.

According to some embodiments of the present disclosure, each of the second coverings has a side surface, and the side surface and the corresponding sidewall of the mark form a common etched surface. There is no metal nanowire protruding out of the side surface of the second covering According to some embodiments of the present disclosure, no metal nanowires exist in the sidewall of the peripheral wires and the sidewall of the marks.

According to some embodiments of the present disclosure, the marks include bonding alignment marks disposed on the peripheral area of each touch panel. Alternatively, the marks include cutting alignment marks disposed between the neighboring touch panels. Still alternatively, the marks include visual instructions, such as alignment marks, direction marks, dimension marks or numeral/literal marks disposed on the substrate.

According to some embodiments of the present disclosure, the width of the peripheral wire is in a range from 5 µm to 20 µm, and the distance between neighboring two peripheral wires is in a range from 5 µm to 20 µm.

According to some embodiments of the present disclosure, the peripheral wires and the marks are made of a metal material, and the touch sensing electrode is formed by patterning the metal nanowire layer so that the touch sensing electrode comprises the metal nanowires.

DETAILED DESCRIPTION

Figure 1:
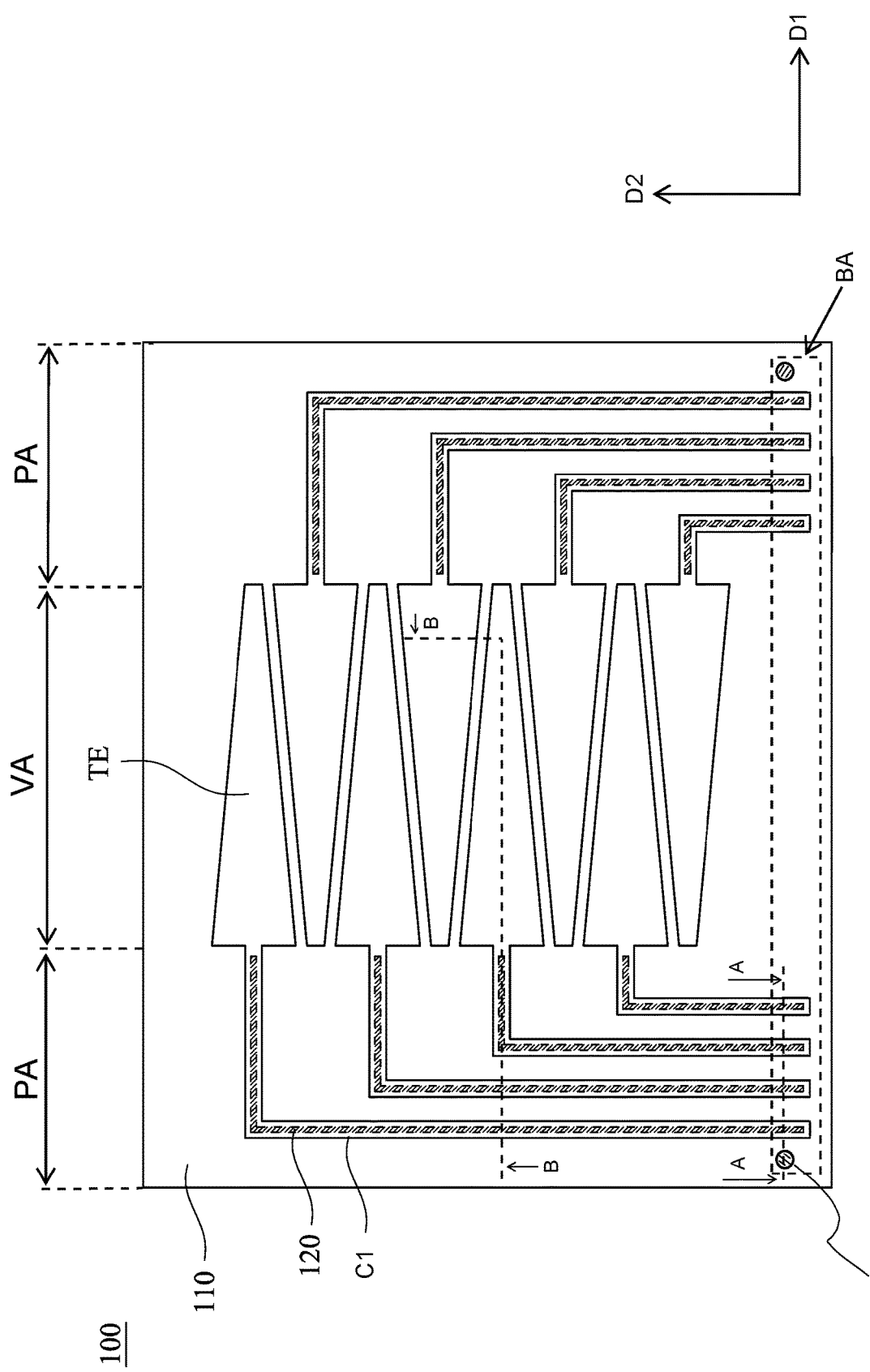
FIG. 1 is a schematic top view of a touch panel in accordance with some embodiments of the present disclosure.

The following drawings disclose a plurality of embodiments of the present disclosure, and for the purpose of clarity, many substantive details will be described in the following description. However, it is understood that the substantive details are not intended to be limiting. That is to say, in the embodiments of the present disclosure, the substantive details are not necessary. Further, to simplify the drawings, some of the customary structures and components in the drawings will be in the form of a simple schematic.

The terms "about", "approximately", and "substantially" used herein generally refer to a value of an error or a range within 20 percent, preferably within 10 percent, and more preferably within 5 percent. If there is no specific description, the mentioned values are regarded as an approximation that is the deviation or the range expressed as "about", "approximate", or "substantially".

FIG. 1 is a schematic top view of a touch panel 100 in accordance with some embodiments of the present disclosure. The touch panel 100 includes a substrate 110, one or more peripheral wires 120, one or more marks 140, one or more first coverings C1, one or more second coverings C2, and one or more touch sensing electrodes TE. The quantity in the following embodiments and drawings is merely for explanation and not intended to limit the disclosure. As shown in FIG. 1, the substrate 110 has a display area VA and a peripheral area PA, and the peripheral area PA is disposed on at least a side of the display area VA. For example, the peripheral area PA is a frame-shaped region on the four sides (i.e., including a right side, a left side, a top side, and a bottom side) of the display area VA. In another embodiment, the peripheral area PA may be an L-shaped region at the left side and the bottom side of the display area VA. As shown in FIG. 1, eight peripheral wires 120 and the first coverings C1 corresponding to the peripheral wires 120 are disposed on the peripheral area PA of the substrate 110. The touch sensing electrode(s) TE is disposed on the display area VA of the substrate 110 and electrically connected with the peripheral wires 120. In this embodiment, two marks 140 and the second coverings C2 corresponding to the marks 140 are disposed on the peripheral area PA of the substrate 110. The first coverings C1 and the second coverings C2 are disposed on the top surface 124 of the peripheral wires 120 and the top surface 144 of the marks 140 respectively. Accordingly, two layers e.g., first covering C1 and peripheral wire 120, or second coverings C2 and mark 140 are disposed at the predetermined positions for forming a stackup without alignment. This configuration can reduce or avoid the requirement for disposing the alignment tolerance area during the manufacturing processes, thereby decreasing the width of the peripheral area PA to achieve the narrow border design or ultra-narrow border design of the display device.

In detail, in some embodiments of the present disclosure, the peripheral wires 120 and the marks 140 may be made of metal materials with preferable electrical conductivity which is a single-layer conductive structure, such as a silver layer, a copper layer, etc., or a multilayer conductive structure, such as molybdenum/aluminum/molybdenum, copper/nickel, titanium/aluminum/titanium, molybdenum/chromium, etc. The mentioned metal structure may be opaque or non-transparent, for example having a transmission of visible light (i.e., a wavelength in a range from 400 nm to 700 nm) less than about 90%. The first coverings C1 and the second coverings C2 may be a metal nanowire layer at least including a plurality of metal nanowires, such as a silver nanowire layer, a gold nanowire layer, or a copper nanowire layer. In more detail, the term "metal nanowires" used herein is a collective noun, which is a collection of metal nanowires including a plurality of nanowires of elementary metals, a metal alloy, or a metallic compound (for example metal oxides), and the quantity of the included metal nanowires does not affect the scope of the present disclosure. At least one of the cross-sectional dimensions (i.e., the diameter of the cross-section) of a single metal nanowire is less than about 500 nm, preferably less than about 100 nm, and more preferably less than about 50 nm. The nano-structure referred to the term "wire" of the present disclosure mainly has a high aspect ratio (length divided by the diameter of the cross-section), such as in a range from 10 to 100000, and in more detail, the aspect ratio of the metal nanowire(s) may be more than about 10, preferably more than about 50, and more preferably more than about 100. The metal nanowires may be made of metals, including, but is not limited to, silver, gold, copper, nickel, or gold-plated silver. Other terms such as silk, fiber, tube, etc. having the dimension and high aspect ratio as that is mentioned above may also be included in the scope of the present disclosure.

The touch sensing electrode TE of this embodiment is substantially disposed on the display area VA, and the touch sensing electrode TE is electrically connected to the peripheral wires 120. Specifically, the touch sensing electrode TE may also be the metal nanowire layer at least including metal nanowires, as well as the first coverings C1/the second coverings C2. In an embodiment, the layer of metal nanowires is processed to form the touch sensing electrodes TE on the display area VA and to form the first coverings CV the second coverings C2 on the peripheral area PA. Accordingly, the touch sensing electrodes TE are in an electrical connection with the peripheral wires 120 via the first coverings C1 to transmit signal between the touch sensing electrodes TE and the peripheral wires 120. The layer of metal nanowires also form the second coverings C2 on the peripheral area PA, and the second coverings C2 are disposed on the top surface 144 of the marks 140. The marks 140 may widely refer to non-electrical functional features, such as patterns, structures or layers but not limited to them. In some embodiments of the present disclosure, the peripheral wires 120 and the marks 140 may be formed by processing one metal layer; in other words, the peripheral wires 120 are made of the same metal material with the marks 140. On the other hand, the touch sensing electrode TE, the first coverings C1, and the second coverings C2 may be formed by processing one metal nanowire layer. The method of processing the metal layer includes patterning, dry-etch, wet etch, or lithograph steps. Similarly, the method of processing the metal nanowire layer includes patterning, dry-etch, wet etch, or lithograph steps.

Figure 1A:
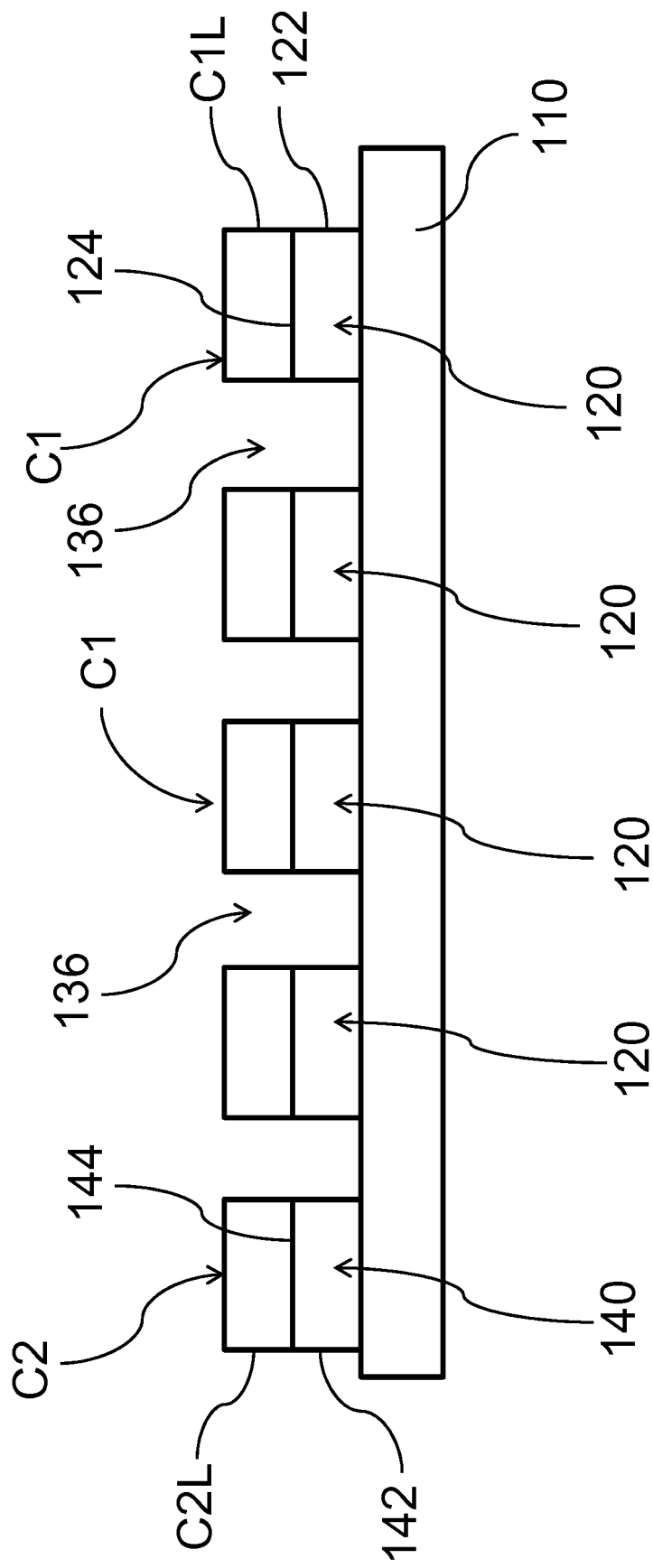
FIG. 1A is a schematic cross-sectional view along line A-A of FIG. 1.
Figure 1B:
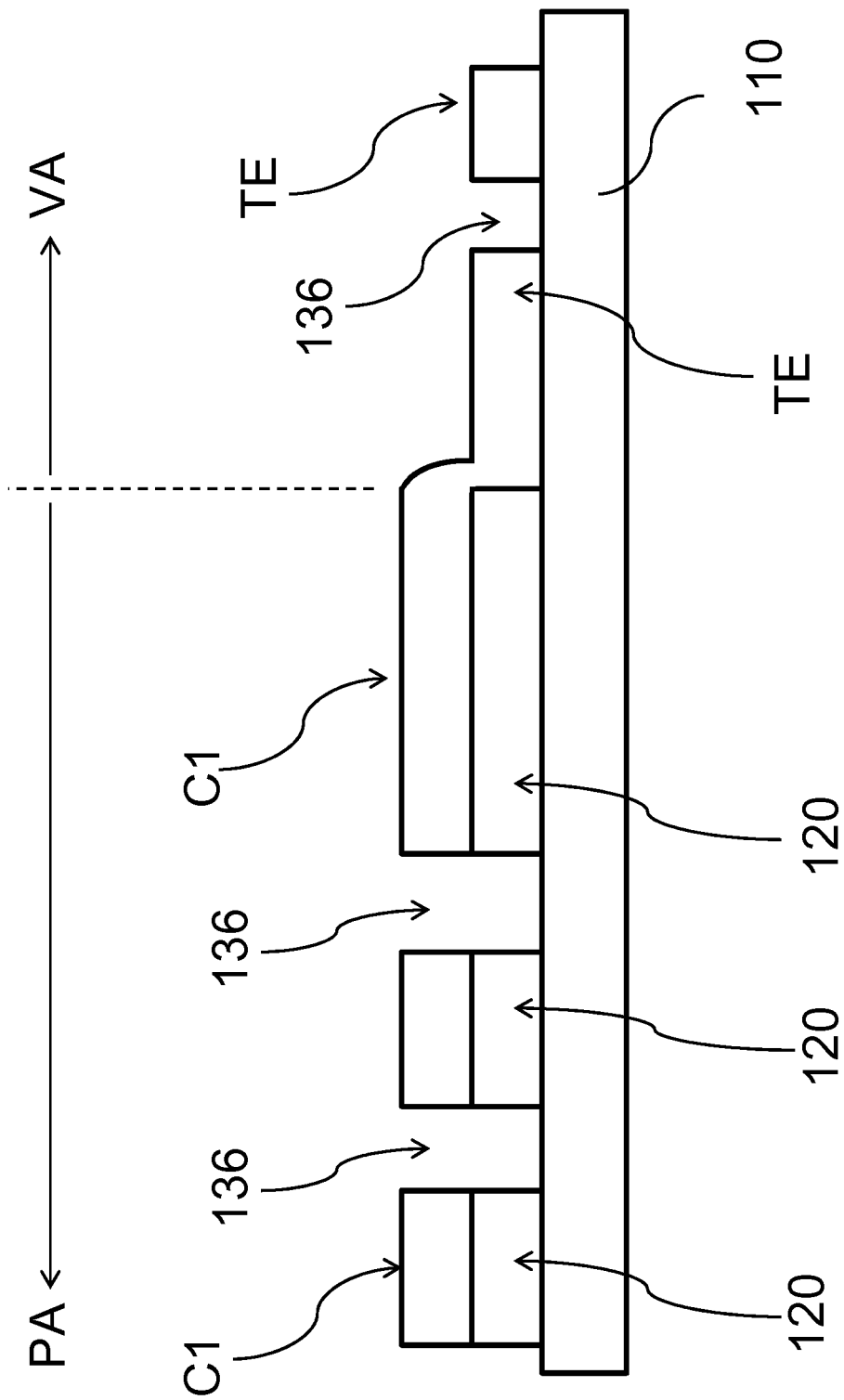
FIG. 1B is a schematic cross-sectional view along line B-B of FIG. 1.

FIG. 1A and FIG. 1B are schematic cross-sectional views of line A-A and line B-B of FIG. 1 respectively. Referring to FIG. 1A, the first coverings C1 and the second coverings C2 are formed to cover the top surface 124 of the peripheral wires 120 and the top surface 144 of the marks 140 respectively, as shown in FIG. 1A. In some embodiments of the present disclosure, the metal nanowires include silver nanowires. For the sake of simplicity, the cross-sectional views of the peripheral wires 120 and the marks 140 in this embodiment are quadrilateral (e.g., a rectangle illustrated in FIG. 1A), but the features of structures or the quantity of the sidewall 122 and the top surface 124 of the peripheral wires 120, and features of structures or the quantity of the sidewall 142 and the top surface 144 of the marks 140 may be changed according to actual applications without being limited to the text and drawings herein.

In the embodiments of the present disclosure, the marks 140 that are bonding alignment marks are disposed on the bonding area BA of the peripheral area PA. The bonding alignment mark is used for aligning an outer printed circuit board with the touch panel 100 while bonding the outer printed circuit board such as a flexible printed circuit 170 to the touch panel 100 (i.e., bonding step) (referring to FIG. 2). However, the disclosure does not limit the locations or functions of the marks 140; for example, the marks 140 may include inspection marks, patterns or markings required in the manufacturing processes. The marks 140 may include desired shapes, such as circularity, quadrilateral, cruciform, L-shape, T-shape, etc, from a top view. On the other hand, a portion of each peripheral wire 120 extending to the bonding area BA may also be called "bonding section", and a top surface of the bonding section in the bonding area BA is also covered by the first coverings C1.

In the peripheral area PA, a non-conductive area 136 is disposed between the adjacent peripheral wires 120 to electrically isolate the adjacent peripheral wires 120, as shown FIGS. 1A and 1B. In other words, the non-conductive area 136 is disposed between the neighboring sidewalls 122 of the adjacent peripheral wires 120 to prevent from a short-circuit between the adjacent peripheral wires 120. In this embodiment, the non-conductive area 136 is a gap (i.e., an air space) to electrically insulate the adjacent peripheral wires 120, and the surface of the substrate 110 in the non-conductive area 136 is exposed from metal materials (i.e., peripheral wire 120) and metal nanowires (i.e., first coverings C1). In the steps of forming the first coverings C1 on the peripheral wires 120, an etching process can be adopted to form the structure of gaps. For example, the sidewalls 122 of the peripheral wires 120 and the corresponding side surfaces C1L of the first coverings C1 are aligned with each other to define a common etched surface or a co-planar etching surface. In other words, the sidewall 122 of the peripheral wires 120 and the side surface C1L of the first coverings C1 are formed in the one etching operation by one kind of etchants. Alternatively, it is also possible to form the side surfaces C1L of the first coverings C1 by a first etching step using one kind of etchants, and then to form the sidewalls 122 of the peripheral wires 120 by a second etching step using another kind of etchants. Similarly, the sidewalls 142 of the marks 140 and the corresponding side surfaces C2L of the second coverings C2 are aligned with each other to form a common etched surface or a co-planar etching surface. In one embodiment, the metal nanowires can be removed from the side surface C1L of the first coverings C1 and the side surfaces C2L of the second coverings C2 due to the etching operation by the above-mentioned etch process. In other words, no metal nanowire exists on or protrudes out of the side surface C1L and the side surfaces C2L.

In addition, in the bonding area BA illustrated in FIG. 1A, the non-conductive area 136 is disposed between the adjacent bonding sections, and the sidewall 122 of the bonding section and the corresponding side surface C1L of the first covering C1 are aligned with each other to form a common etched surface or a co-planar etching surface. Further, the peripheral wires 120 and the first coverings C1 have identical or similar pattern and dimension. For example, the peripheral wire 120 and the corresponding first covering C1 are formed as straight-line patterns, etc., and also have identical or similar width. The marks 140 and the second coverings C2 also have identical or similar pattern and dimension. For example the mark 140 and the corresponding second covering C2 can be circles with the same or similar diameter, rectangles with the same or similar lengths, or other same or similar patterns (e.g. crosses, L-shapes, or T-shapes).

As shown FIG. 1B, the non-conductive area 136 is disposed between the adjacent touch sensing electrodes TE to electrically isolate the adjacent touch sensing electrodes TE in the display area VA. In other words, the non-conductive area 136 is disposed between the sidewalls of the adjacent touch sensing electrodes TE to prevent from a short circuit between the adjacent touch sensing electrodes. In this embodiment, the non-conductive area 136 is a gap (i.e., an air space) to electrically insulate the adjacent touch sensing electrodes TE, and the surface of the substrate 100 in the on-conductive area 136 is exposed from metal nanowires (i.e., touch sensing electrodes TE). In one embodiment, the above mentioned etching process may be adopted to form the gap between the adjacent touch sensing electrodes TE. In this embodiment, the touch sensing electrodes TE and the first coverings C1 may be made by the same layer of the metal nanowires (e.g., the silver nanowire layer). The metal nanowires layer forms a climbing structure at the boundary between the display area VA and the peripheral area PA so that the metal nanowires climb onto and cover the top surfaces 124 of the peripheral wires 120, thereby forming the first coverings C1.

In some embodiments of the present disclosure, the first coverings C1 and the second coverings C2 of the touch panel 100 are disposed on the top surface 124 of the peripheral wires 120 and the top surface 144 of the marks 140 respectively. This configuration can reduce or avoid the need of disposing alignment tolerance area during manufacturing processes. As a result, the width of the peripheral area PA is reduced, and the requirement of narrowed frame border is met. Specifically, a width of the peripheral wire 120 of the touch panel 100 in some embodiments of the present disclosure is in a range from 5 μm to 20 μm, and the distance between two adjacent peripheral wires 120 is in a range from 5 μm to 20 μm. Preferably, the width of the peripheral wire 120 of the touch panel 100 is in a range from 3 μm to 20 μm, and the distance between two neighboring peripheral wires 120 is in a range from 3 μm to 20 μm. The width of the peripheral area PA is less than about 2 mm, which reduces about 20 percent or more of the dimension of the peripheral area PA in the conventional touch panels.

Figure 2:
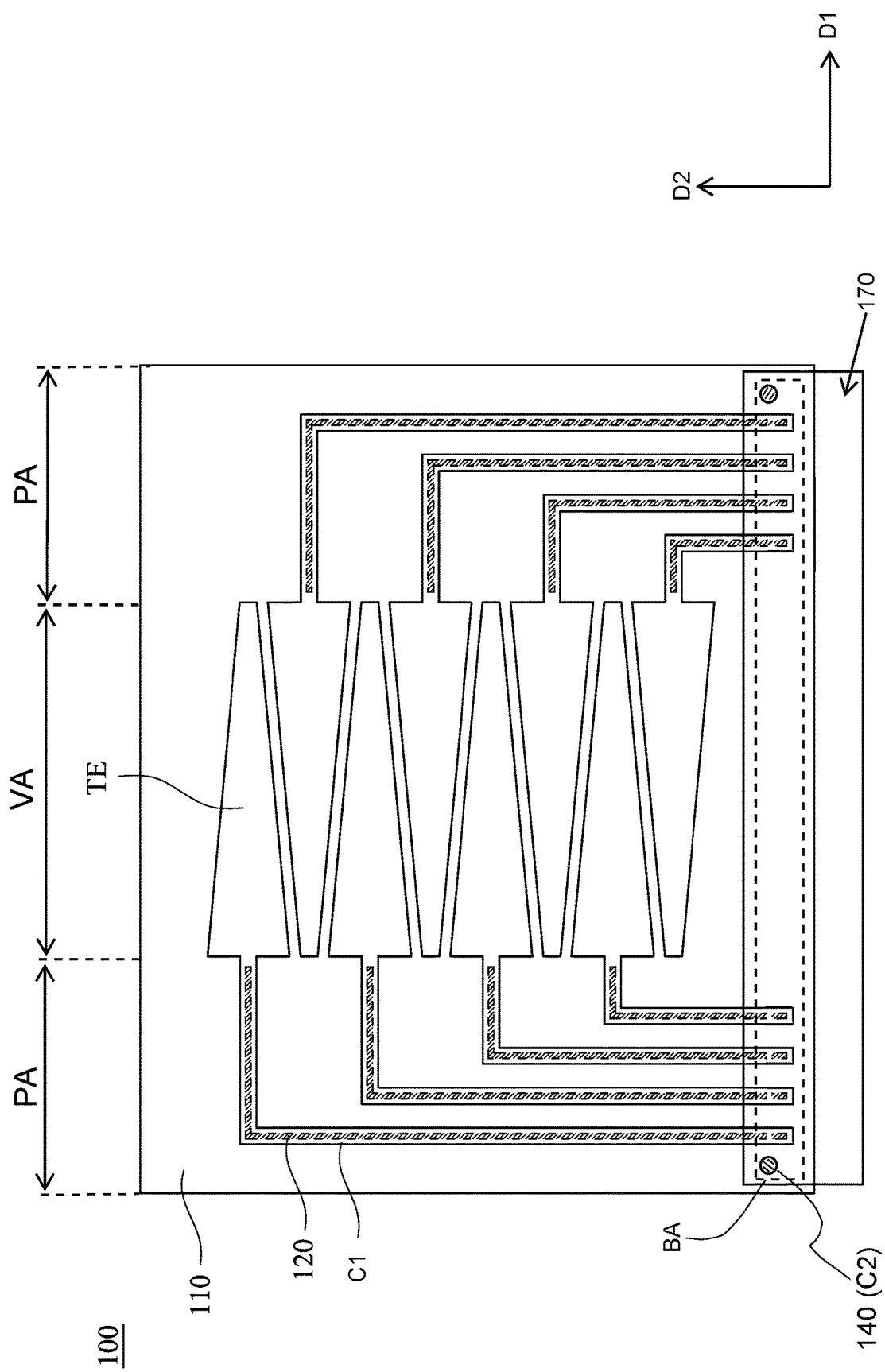
FIG. 2 is a schematic top view of a touch panel assembled with a flexible printed circuit board in accordance with some embodiments of the present disclosure.

FIG. 2 illustrates an assembly structure of the flexible printed circuit 170 aligned with the touch panel 100. Spe-cifically, electrode pads (not shown) of the flexible printed circuit 170 may be electrically connected to the peripheral wires 120 on the bonding area BA of the substrate 110 by conductive adhesives (not shown, e.g., anisotropic conductive adhesives). In some embodiments, electrode pads of the flexible printed circuit 170 may be bonded to the peripheral wires 120 with the first coverings C1 disposed between the electrode pads of the flexible printed circuit 170 and the bonding sections of the peripheral wires 120. Alternatively, an opening (not shown) may be formed in the first coverings C1 in the bonding area BA to expose a portion of each bonding section of the peripheral wires 120. As a result, the conductive adhesives may be filled into the opening of the first coverings C1 so that the electrode pads of the flexible printed circuit 170 are in contact with the peripheral wires 120 through the conductive adhesives to form a transmission circuit. In this embodiment, the touch sensing electrodes TE are disposed on a non-cross manner. For example, the touch sensing electrodes TE may be strip type electrodes extending along the first direction D1 without overlapping with each other. Alternatively, the touch sensing electrodes TE may have suitable shapes. In this embodiment, the touch sensing electrodes TE adopt an arrangement of single layer, and the touch position may be detected by calculating the variation of the capacitance value of individual touch sensing electrode TE.

Figure 3A:
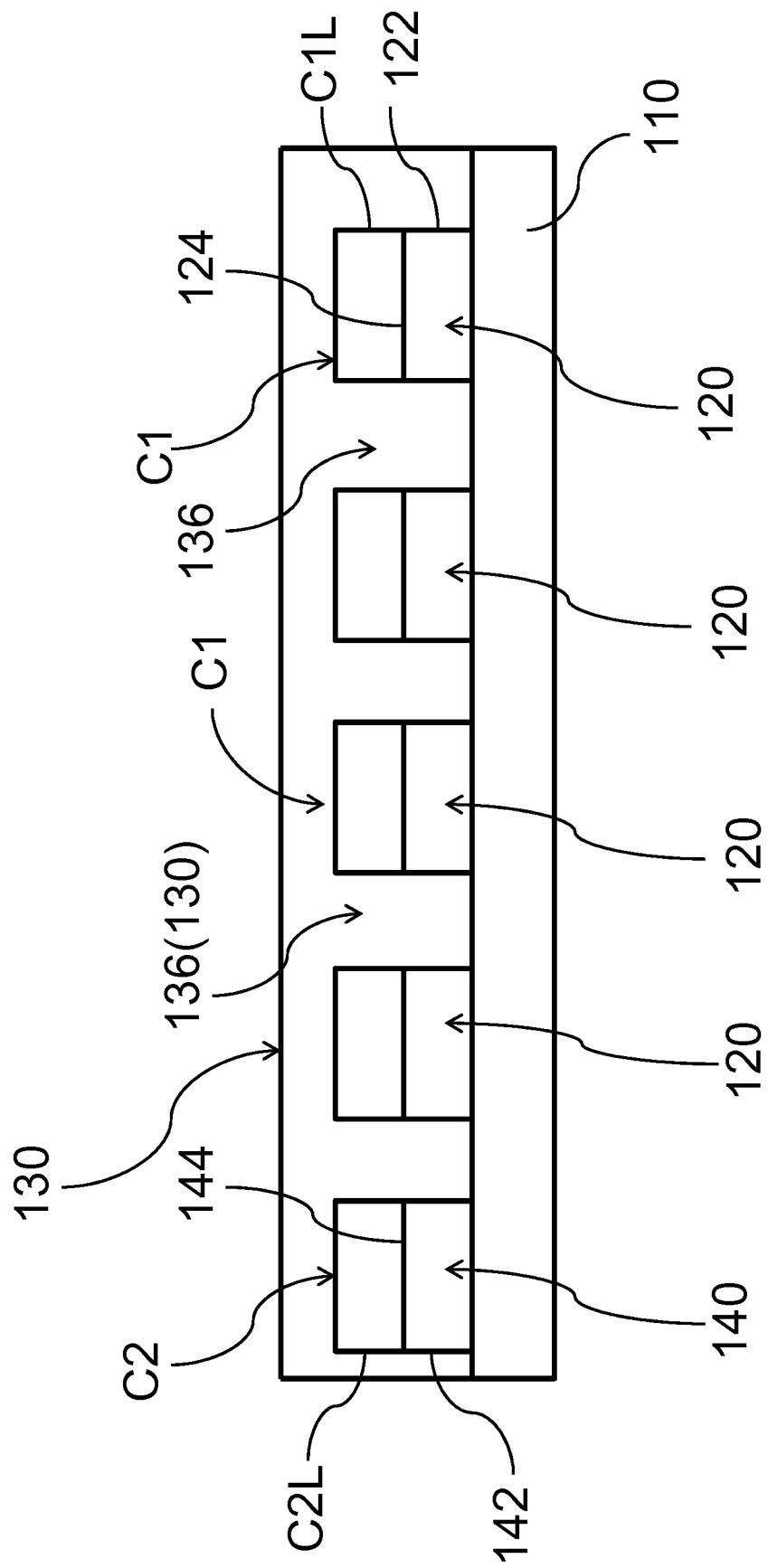
FIG. 3A is a schematic cross-sectional view along line A-A of FIG. 1 in accordance with modified embodiments.
Figure 3B:
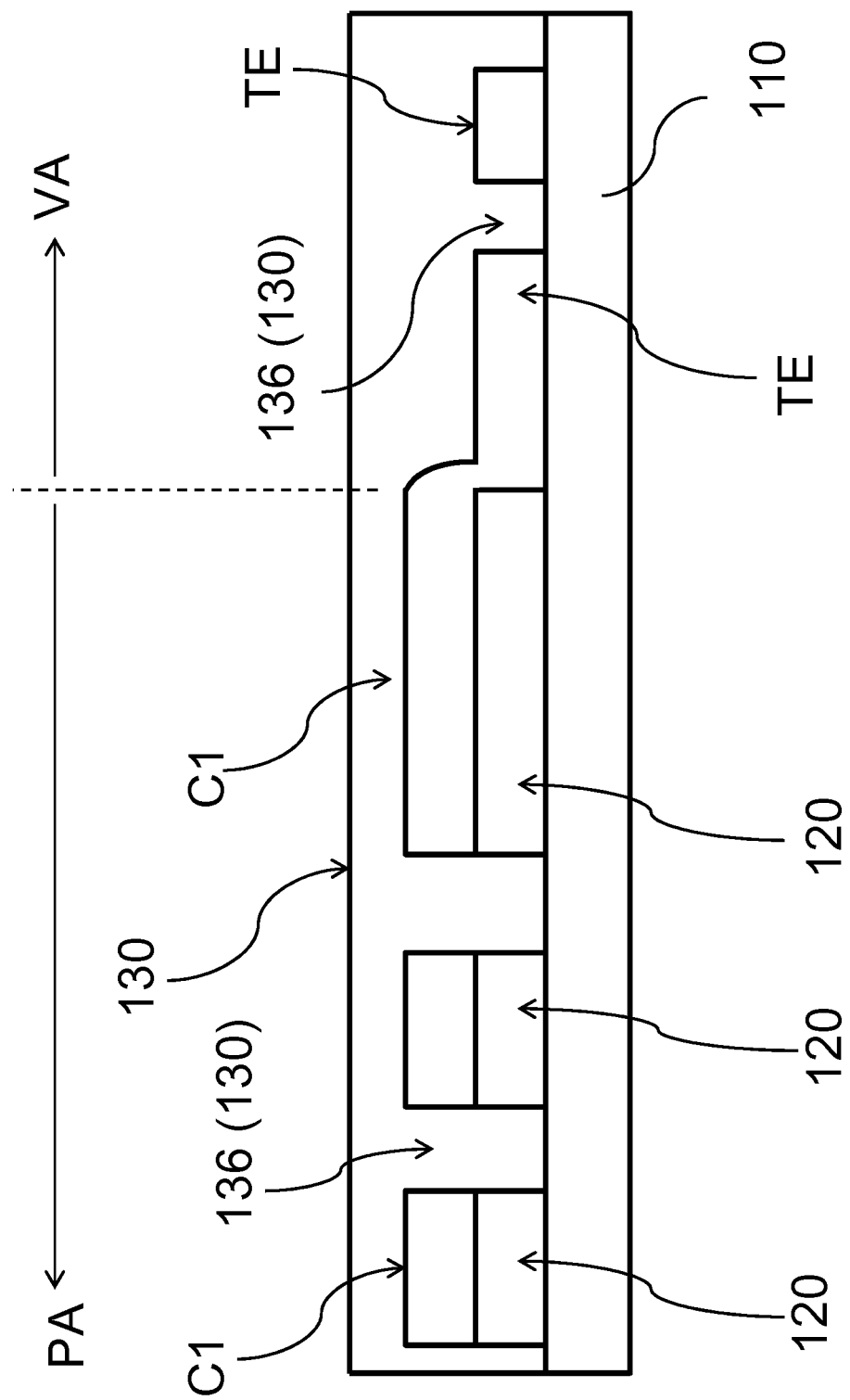
FIG. 3B is a schematic cross-sectional view along line B-B of FIG. 1 in accordance with modified embodiments.

In one embodiment, the touch panel 100 may include a coating layer 130, and FIG. 3A and FIG. 3B are schematic cross-sectional views of the preceding embodiment after forming the coating layer 130 on the patterned structures along line A-A and line B-B of FIG. 1 respectively. In one embodiment, the coating layer 130 covers the touch panel 100 entirely. In other words, the coating layer 130 covers the touch sensing electrodes TE, the first coverings C1, and the second coverings C2. In the peripheral area PA, the coating layer 130 covers the first coverings C1 and the second coverings C2, as shown in FIG. 3A and FIG. 3B. The coating layer 130 also fills into the non-conductive area 136 between the adjacent peripheral wires 120. In other words, a filling layer made of the same material as the coating layer 130 is formed in the non-conductive area 136 between the adjacent peripheral wires 120. The filling layer in the non-conductive area 136 between the adjacent peripheral wires 120 performs as an insulator to electrically isolate the adjacent peripheral wires 120. In addition, for a stackup structure of the corresponding peripheral wire 120 and the first covering C1, the coating layer 130 surroundingly covers the stackup structure. Specifically, the coating layer 130 covers and contacts the top surface of the first covering C1, the sidewalls 122 of the peripheral wire 120, and the side surfaces C1L of the first covering C1, in view of a single stackup structure of the corresponding peripheral wire 120 and first covering C1. In other words, each of the peripheral wires 120 has a sidewall 122 and a top surface 124, and each of the first coverings C1 has a side surface C1L. The side surface C1L is aligned with the sidewall 122, and the aligned side surface C1L and the sidewall 122 both contact the filling layer (e.g., the coating layer 130). The first covering C1 is formed onto the corresponding peripheral wire 120 and contacts the top surface 124 of the corresponding peripheral wire 120.

Similarly, for a stackup structure of the corresponding mark 140 and the second covering C2, the coating layer 130 surroundingly covers the stackup structure. Specifically, the coating layer 130 covers and contacts the top surface of the second covering C2, the sidewalls 142 of the mark 140, and the side surfaces C2L of the second covering C2, in view of a single stackup structure of the corresponding mark 140 and second covering C2. In other words, each of the marks 140 has a sidewall 142 and a top surface 144, and each of the second coverings C2 has a side surface C2L. The side surface C2L is aligned with the sidewall 142, and the aligned side surface C2L and sidewall 142 both contact the filling layer (e.g., the coating layer 130). Each of the second coverings C2 is formed onto the corresponding mark 140 and contacts the top surface 144 of the corresponding mark 140.

In the display area VA, the coating layer 130 covers the touch sensing electrodes TE, and the coating layer 130 fills the non-conductive area 136 between the adjacent touch sensing electrodes TE, as shown in FIG. 3B. In other words, a filling layer made of the same material as the coating layer 130 is disposed in the non-conductive area 136 between the adjacent touch sensing electrodes TE. The filling layer in the non-conductive area 136 between the adjacent touch sensing electrodes TE performs as an insulator to electrically isolate the adjacent touch sensing electrodes TE.

Alternatively, the coating layer 130 is coated on the metal nanowires layer before patterning the metal nanowire layer. The metal nanowires are preferably embedded into the coating layer 130 as an integrated transparent conductive film. The integrated transparent conductive film is then patterned to formed touch sensing electrodes TE in the display area VA, and the first and the second covers C1, C2 in the peripheral area PA. In this embodiment, the non-conductive area 136 between the adjacent touch sensing electrodes TE and the non-conductive area 136 between the adjacent peripheral wires 120 are both gaps. Alternatively, an ink containing metal nanowires and polymer are coated on the substrate, in one coating step, to form the integrated transparent conductive film including the coating layer 130 and the metal nanowires layer.

In this embodiment, a composite structure integrally formed by the touch sensing electrodes TE and the coating layer 130 in the display area VA preferably has electrical conductivity and light transmission. For example, the transmission of the visible light (i.e., a wavelength in a range from 400 nm to 700 nm) of the composite structure is more than about 80%, and the surface resistance is in a range from about 10 to 1000Ω/□ (ohm/square). Preferably, the transmission of the visible light is more than about 85%, and the surface resistance is in a range from about 50 to 500Ω/□ (ohm/square).

In some embodiments of the present disclosure, the materials of coating layer 130 may be polyethylene (PE), polypropylene (PP), polyvinyl butyral (PVB), polycarbonate (PC), acrylonitrile butadiene styrene (ABS), poly-3,4-ethylenedioxythiophene (PEDOT), poly(styrene sulfonate) (PSS), or ceramic materials, etc. In an embodiment of the present disclosure, the materials of coating layer 130 may include the following polymers, but is not limited to, polyacrylic acid resin such as polymethyl acrylate (e.g., poly (methyl methacrylate)(PMMA)), polyacrylate, and polyacrylonitrile; poly(vinyl alcohol); polyester (e.g., polyethylene terephthalate (PET), PEN, polycarbonate); polymers with high aromatic degree such as phenol-formaldehyde resin, cresol-formaldehyde, polystyrene, polyvinyl toluene, polyvinyl dimethylbenzene, polyimide, polyamide, polyamide-imide, polyetherimide, polysulfides, polysulfone, polyphenylene, and polyphenylene ethers; polyurethane (PU); epoxy resin; polyolefins (e.g., polypropylene, polymethylpentene, and cycloalkene); cellulose; silicone and other silicon-containing polymer (e.g., polysilsesquioxane and polysilane); polyvinyl chloride (PVC); poly acetic ester; poly norborene; synthetic rubber (e.g., ethylene-propylene rubber (EPR), styrene-butadiene rubber (SBR), ethylene-propylene-diene monomer (EPDM)); and fluorine-containing polymer (e.g., polyvinylidene fluorine, polytetrafluoroethylene (PTFE), or polyhexafluoropropylene); copolymer of fluorine-olefin and hydrocarbon olefin, etc. In other embodiments, inorganic materials such as silicon dioxide, mullite, aluminium oxide, SiC, carbon fiber, MgO—$Al_2O_3$—$SiO_2$, $Al_2O_3$—$SiO_2$, or MgO—$Al_2O_3$—$SiO_2$—$Li2O$ may be used.

Further, the composite structure formed by the coating layer 130 and the metal nanowires (such as the first coverings C1, the second coverings C2, or the touch sensing electrodes TE) may have some specific chemical, mechanical, and optical properties. For example, an adhesion between the first and second coverings C1, C2, and the substrate 110 is provided, or preferable physical strength of the composite structure is achieved. Accordingly, the coating layer 130 may also be called a "matrix" for penetrating into the spaces in the metal nanowires. On the other hand, using some specific polymers to form the coating layer 130 leads the first coverings C1 and the second coverings C2 to have preferable surface protections, such as anti-scratch ability and abrasion resistance. In such instance, the coating layer 130 may also be called a "hard coat", which adopts the materials of polyacrylate, epoxy resin, polyurethane (PU), polysilane, silicone, poly (silicon-acrylic acid), etc. The coating layer 130 covers the first coverings C1 and the second coverings C2 to provide for a higher surface strength and enhance the scratch resistance. Further, UV stabilizers may be added to the coating layer 130 to enhance the resistance of the first coverings C1 and the second coverings C2 against the UV light. However, the preceding description merely describes possibilities of additional functions/appellations, but the present disclosure is not limited thereto. It is noted that the coating layer 130, the first coverings C1, and the second coverings C2 are illustrated as different layers in the drawings herein. However, the polymer for the coating layer 130 may penetrate between the metal nanowires to form as a filler under the conditions of un-curing or pre-curing. After the polymer cured, the metal nanowires are embedded in the coating layer 130. To sum up, the present disclosure does not limit the structures of the coating layer 130 and the metal nanowires layer (e.g., the first coverings C1, the second coverings C2, or the touch sensing electrode TE).

Figure 4:
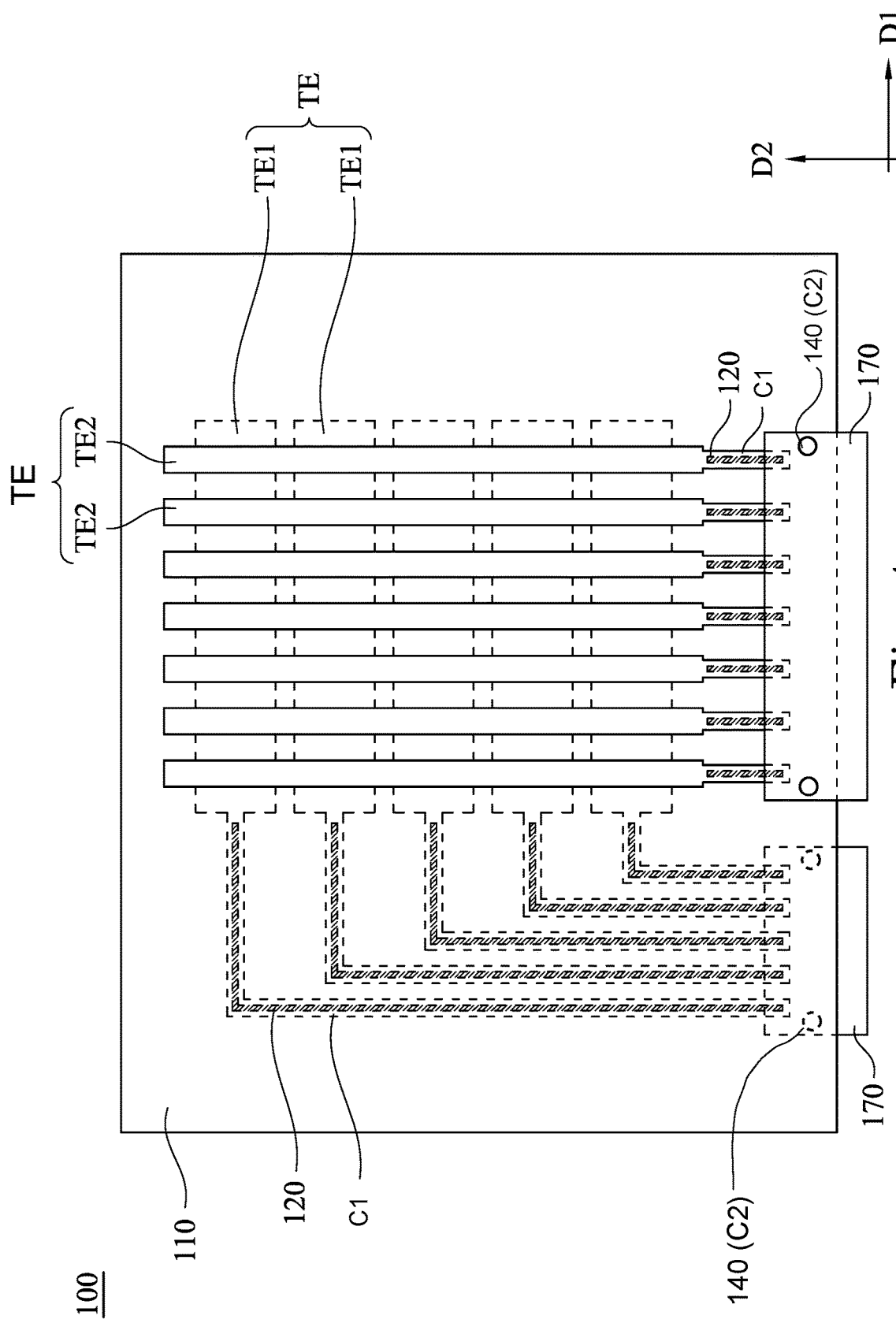
FIG. 4 is a schematic top view of a touch panel in accordance with another embodiment of the present disclosure.

FIG. 4 is a schematic top view of a touch panel 100 in accordance with some embodiments of the present disclosure. This embodiment shows that the touch sensing electrodes TE have an arrangement of double layers.

The first touch sensing electrodes TE1 and second touch sensing electrodes TE2 are used to describe the double-layer feature in this embodiment. one or more first touch sensing electrode TE1 is formed on one surface (such as the bottom surface) of the substrate 110, and one or more second touch sensing electrode TE2 is formed on another surface (such as the top surface) of the substrate 110, so that the first touch sensing electrode TE1 and the second touch sensing electrode TE2 are electrically insulated from each other. The peripheral wires 120 connected to the first touch sensing electrodes TE1 are formed on the bottom surface of the substrate as well as marks 140. Referring FIG. 4, there are first coverings C1 covering the peripheral wires 120 on the bottom surface of the substrate, and second coverings C2 covering the marks 140 on the bottom surface of the substrate. Similarly, the peripheral wires 120 connected to the second touch sensing electrodes TE2 are formed on the top surface of the substrate as well as the marks 140. As shown in FIG. 4, there are first coverings C1 covering the peripheral wires 120 on the top surface of the substrate, and second coverings C2 covering the marks 140 on the top surface of the substrate. The first touch sensing electrodes TE1 may be strip type electrodes extending along a first direction D1, and the second touch sensing electrodes TE2 may be strip type electrodes extending along a second direction D2. In a top view, the first touch sensing electrodes TE1 and the second touch sensing electrodes TE2 extend along different directions and overlap with each other. The first touch sensing electrodes TE1 and the second touch sensing electrodes TE2 can transmit control signals and receive touch sensing signals respectively. Accordingly, a touch position can be obtained by detecting variations of the signals (e.g., variation of capacitance value) between the first touch sensing electrodes TE1 and the second touch sensing electrodes TE2. Thus, a user can touch onto the touch sensing panel for controlling the electronic devices. The touch panel 100 of this embodiment can further include a coating layer 130 which covers the touch panel 100 entirely. In other words, the coating layer 130 is disposed on both the top and bottom surfaces of the substrate, and covers the first touch sensing electrodes TE1 and the second touch sensing electrodes TE2. In addition, the first coverings C1 and the second coverings C2 formed on the top or bottom surfaces of the substrate are covered by the coating layer 130. Alternatively, the coating layer 130 is patterned to match the patterns of the first touch sensing electrodes TE1 and the second touch sensing electrodes TE2, and also match the patterns of the first coverings C1 and the second coverings C2. In the patterning step, the coating layer 130 in the non-conductive area 136 is removed to form the structure of gap to electrically insulate the adjacent electrodes/wires.

Figure 5:
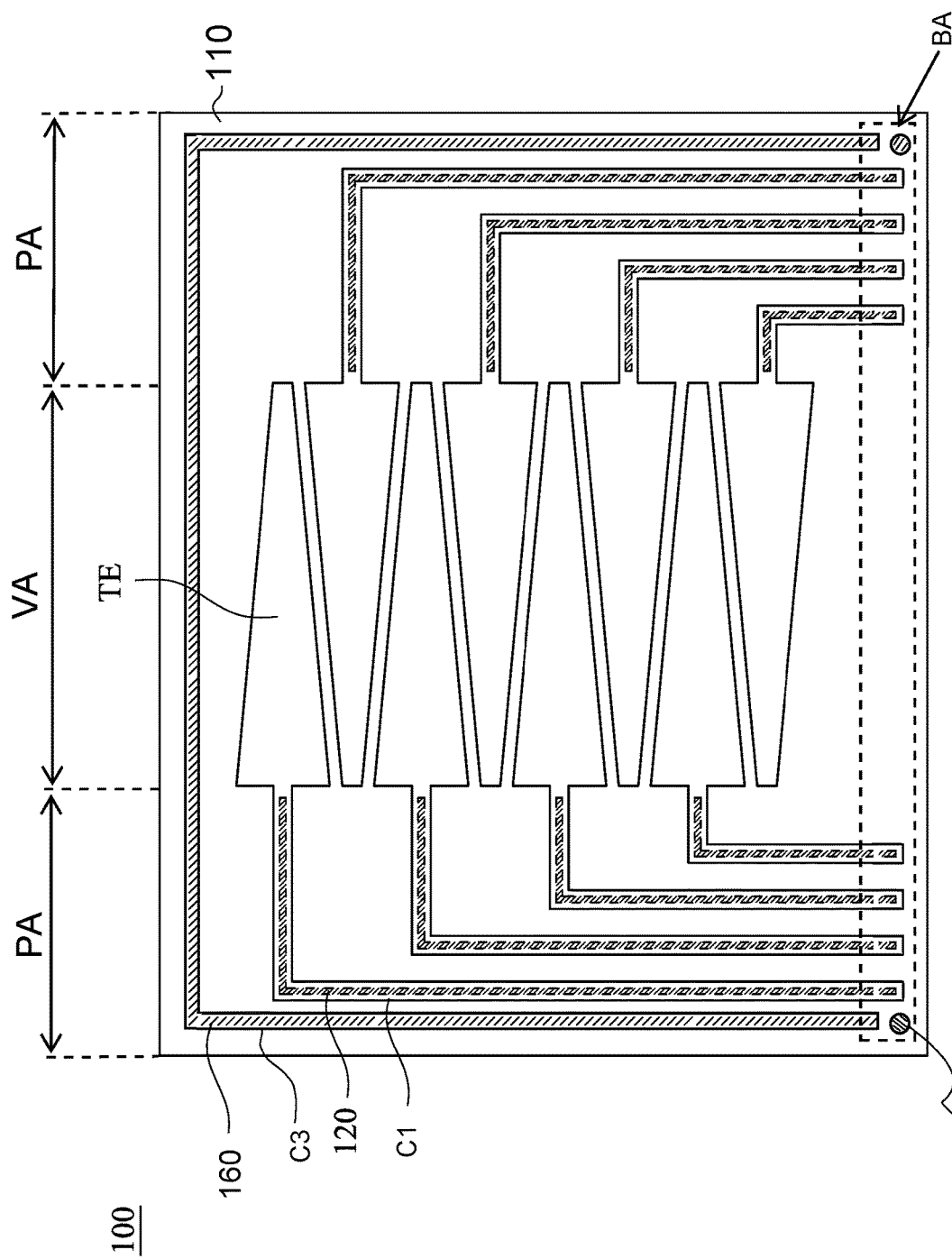
FIG. 5 is a schematic cross-sectional view of a touch panel in accordance with another embodiment of the present disclosure.

FIG. 5 is a schematic top view of a touch panel 100 in accordance with some embodiments of the present disclosure. The touch panel 100 further includes a shielding wire 160 disposed on the peripheral area PA, and third coverings C3 cover the top surface of the shielding wire 160. The shielding wire 160 substantially surrounds the touch sensing electrodes TE and the peripheral wires 120. The shielding wire 160 extends to the bonding area BA to electrically connect a grounding reference on the flexible printed circuit 170. Therefore, the shielding wire 160 can shield or eliminate the signal interference so as to provide for the electrostatic discharge (ESD) protection, especially for preventing from the current variation caused by a hand touching to the conductive parts around the touch sensing device.

The shielding wire 160 may be made of metal materials, and may preferably refer to the description of the peripheral wires 120 and the marks 140. The third coverings C3 are made of metal nanowires, and may preferably refer to the description of the first coverings C1 and the second coverings C2. The specific descriptions of the preceding embodiments may be applied to the shielding wire 160 and the third coverings C3 of this embodiment. In some embodiments of the present disclosure, the shielding wire 160, the peripheral wires 120, and the marks 140 may be made of the same metal layer. In other words, the shielding wire 160, the peripheral wires 120, and the marks 140 are formed by processing one metal material layer. The touch sensing electrodes TE, the third coverings C3, the first coverings C1, and the second coverings C2 may be made of the same metal nanowires layer. The touch panel 100 of this embodiment may further include a coating layer 130 which covers the touch panel 100 entirely. In other words, the coating layer 130 not only covers the touch sensing electrodes TE, the first coverings C1 and the second coverings C2, but also covers the third coverings C3 on the shielding wire 160.

Figure 6:
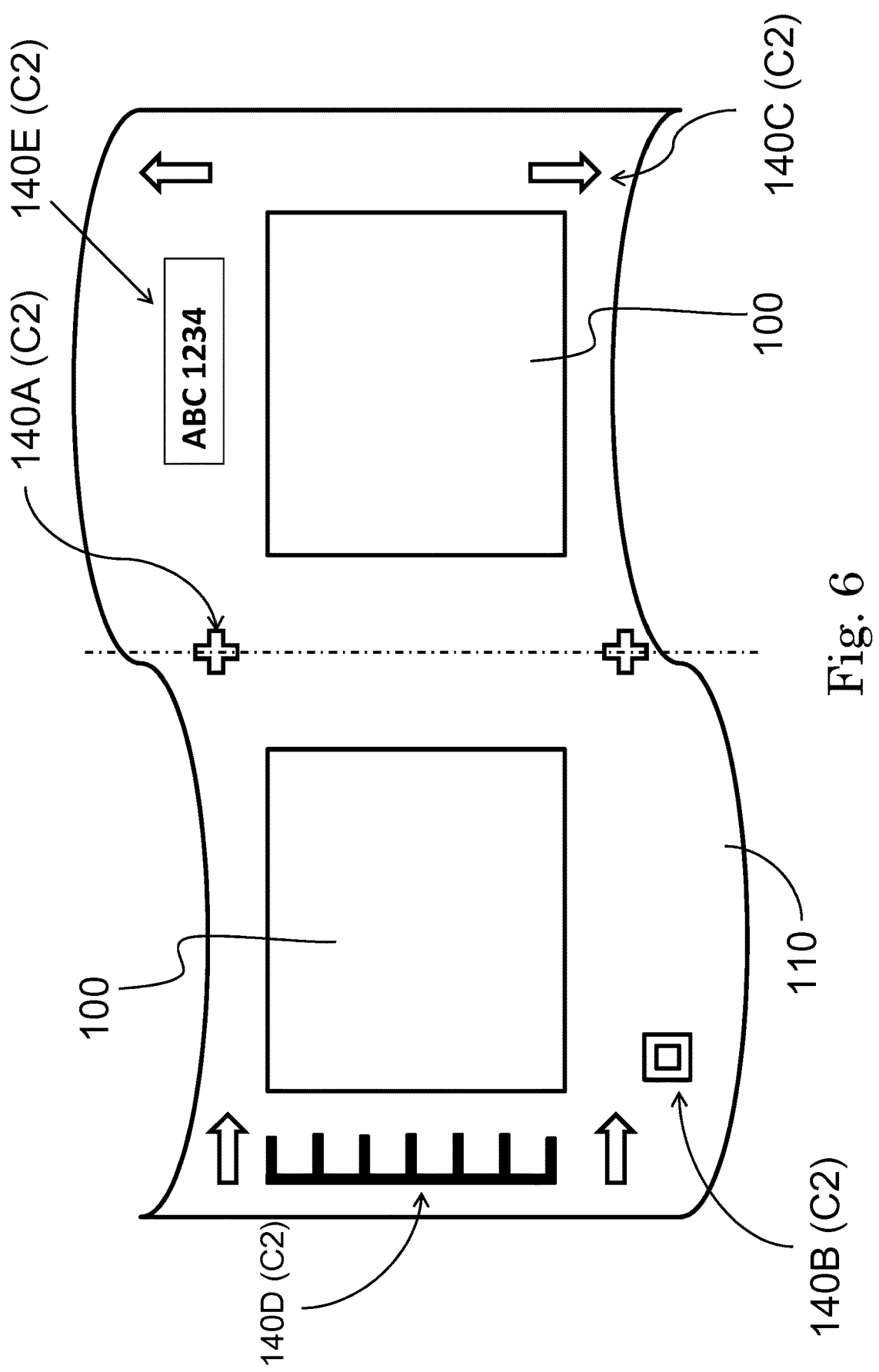
FIG. 6 is a schematic view of a sheet of touch sensors in accordance with the embodiments of the present disclosure.

In some embodiments, the touch panel 100 may be made by the roll to roll process. The roll to roll coating process uses conventional equipment in an automatic control, and the manufacturing cost is significantly reduced. The specific processes of the roll to roll coating for manufacturing touch panels is described as following. First, a flexible substrate 110 is applied, and the row sheet of the flexible substrate 110 is disposed between two rollers. Then, a motor is used to drive the rolls so as to drive the sheet of substrate 110 for continuously moving along the traveling path between the two rollers. For example, a storage tank, a spraying apparatus, a painting apparatus, or the like are used to deposit metal nanowires-containing slurry/ink on the surface of the substrate 110 in a first station, and the ink is dried to form metal nanowires on the substrate 110. A spraying tool is used to deposit the polymer on the surface of the substrate 110 in a second station. The polymer is cured to form the coating layer 130, and there are still other operations along the traveling path. The processed sheet having touch panels 100 are rolled to form a product of rolled sheets by the roller at the final end of the production line. As shown in FIG. 6, in the sheet of the touch sensors, a plurality of touch panels 100 can be made on the surface of the substrate 110, and marks 140 may be also disposed on the surface of the substrate 110. In this embodiment, the marks 140 may be cutting alignment marks 140A located between the touch panels 100. These are mainly used for dicing, cutting, and other operations to form individual touch panels 100 from the sheet of the touch sensors. Referring to FIG. 6, the left and right touch panels 110 can be divided into individual touch panels 100 along the cutting line defined by the cutting alignment marks 140A on the substrate 110. The marks 140 may also include alignment marks 140B, direction marks 140C, dimension marks 140D, numeral/literal marks 140E. For example, the alignment marks 140B may be used for alignments. The direction marks 140C may be used for demonstrating the process direction, such as the MD/TD direction of the substrate 110. The dimension marks 140D may be used for showing scales. The numeral/literal marks 140E may be used for patterns such as logos. In other words, the marks 140 of this embodiment may include the cutting alignment marks 140A formed on the sheet and disposed between the touch panels 100, or other marks 140A-140E. Alternatively, the bonding alignment marks on the peripheral area PA of the touch panel 100 or the marks needed in other processes may be included. Similar to the preceding embodiments, the marks 140A-140E of this embodiment are made of metal materials and covered by the second coverings C2, and the specific description can be referred to above. The specific description of the touch panel 100 in this embodiment can also be referred to above, and hence is not repeated herein.

The sheet of this embodiment may further include a coating layer 130 which entirely covers the uncut touch panels 100 on the sheet. In other words, the coating layer 130 is formed on the entire surface of the sheet and covers the uncut touch panels 100 on the sheet, and then the touch panels 100 are divided into individual touch panels 100 by a cutting step.

Alternatively, the coating layer 130 has a patterned structure to cover individual touch panels 100. The second coverings C2 on the marks 140A-140E formed between the adjacent touch panels are exposed. In other words, there is no coating layer 130 formed on the second coverings C2 on the marks 140A-140E formed between the adjacent touch panels 100, and there is no coating layer 130 formed on the surface of the un-functional areas of sheet between the adjacent touch panels 100. The un-functional area of sheet means the area where no marks 140A-140E formed.

Still alternatively, the coating layer 130 has a patterned structure to cover individual touch panels 100 and the second coverings C2 on the marks 140A-140E formed between the adjacent touch panels 100. In other words, there is no coating layer 130 formed on the surface of the un-functional areas of sheet between the adjacent touch panels 100.

Alternatively, the coating layer 130 is patterned to match the patterns of the first touch sensing electrodes TE1 and the second touch sensing electrodes TE2, and also match the patterns of the first coverings C1 and the second coverings C2 of each touch panels 100 on the sheet. In addition, the coating layer 130 is patterned to match the patterns of the second coverings C2, which cover the marks 140A-140E located between the touch panels 100. After patterning the coating layer 130, the touch panels 100 are divided into individual touch panels 100 by a cutting step. As discussed above, the coating layer 130 in the non-conductive area 136 is removed to form the structures of gap to electrically insulate the adjacent electrodes/wires. On the other hand, the coating layer 130 in the area between the adjacent marks 140A-140E is removed so that there is also a gap formed between the adjacent marks 140A-140E.

In some embodiments of the present disclosure, the substrate 110 is preferable a transparent substrate. In detail, the substrate 110 may be a rigid transparent substrate or a flexible transparent substrate, and the material includes glass, acrylics (polymethylmethacrylate (PMMA)), polyvinyl chloride (PVC), polypropylene (PP), polyethylene terephthalate (PET), polyethylene naphthalate (PEN), polycarbonate (PC), polystyrene (PS), or other transparent materials.

In the embodiment of the present disclosure, the metal nanowires-containing slurry/ink includes dispersant, which may be water, alcohol, ether, hydrocarbon, or aromatic solvent (benzene, toluene, xylene, etc.). The dispersant may also include additives, surfactants, or adhesives, such as carboxymethyl cellulose (CMC), hydroxyethyl Cellulose (HEC), hydroxypropyl methylcellulose (HPMC), sulfonate, sulfate, disulfonate, sulfosuccinic ester, phosphate ester, or fluorine-containing surfactant, etc. In some embodiments of the present disclosure, the metal nanowires may be silver nanowires or silver nano-fibers having an average diameter in a range from about 20 nm to 100 nm, an average length in a range from about 20 μm to 100 μm, a preferable average diameter in a range from about 20 nm to 70 nm, and a preferable average length in a range from about 20 μm to 70 μm (i.e., the aspect ratio is about 1000). In some embodiments, the diameter of the metal nanowires may be in a range from 70 nm to 80 nm, and the length of that may be about 8 μm.

In some embodiments of the present disclosure, the coating layer 130 is made of insulating materials. For example, the material of the coating layer 130 may be non-conductive resin or other organic materials. In some embodiments of the present disclosure, the coating layer 130 may be formed by a spin coating method, a spray coating method, or printing methods, etc. In some embodiments of the present disclosure, the thickness of the coating layer 130 is in a range from about 20 nm to 10 μm, or 50 nm to 200 nm, or 30 nm to 100 nm. For example, the thickness of the coating layer 130 is about 90 nm or 100 nm.

In the production line of the roll to roll, the sequence of multiple coating operations can be adjusted along the traveling path, or can be incorporated into additional operations as required. For example, for post treatment processes to the metal nanowires, the pressure rollers or the plasma treatment equipment may be installed in the production line.

In some embodiments, the formed metal nanowires may be further processed by post treatments to enhance the electrical conductivity. The post treatments may include heating, plasma, corona discharge, UV-ozone, pressure, or the combination thereof. For example, after curing the ink to form the metal nanowire layer, a roller may be used to press on the metal nanowire layer. In one embodiment, pressure of 50 to 3400 psi may be applied to the metal nanowire layer by one or more rollers, preferably pressure of 100 to 1000 psi, 200 to 800 psi, or 300 to 500 psi. The step of applying pressure is preferably performed before the step of coating the coating layer 130. In some embodiments, the post treatments of heating and pressure may be performed simultaneously. In detail, applying pressure by rollers and heating may be performed to the metal nanowires at the same time to enhance the electrical conductivity of metal nanowires. For example, the pressure applied by the rollers is in a range from 10 to 500 psi, preferably from 40 to 100 psi; and the roller is heated in a range from about 70 Celsius degree to 200 Celsius degree, preferably from 100 Celsius degree to 175 Celsius degree so as to apply heat and pressure to the metal nanowires. In some embodiments, the metal nanowires may be preferably exposed to a reducing agent for post-treatment. For example, the conductor including silver nanowires may be preferably exposed to a silver reducing agent for post-treatment. The silver reducing agent includes hydroboration (e.g. sodium borohydride), boron nitrogen compounds (e.g. dimethylaminoborane (DMAB)), or gas reducing agents (e.g. hydrogen ($H_2$)). The exposure time is about 10 seconds to about 30 minutes, and preferably about 1 minute to about 10 minutes.

Other details of the embodiments are substantially same as that of the embodiments above, and hence are not repeated herein.

The structures of different embodiments of the present disclosure may be applied to each other, and hence are not limited to the respective specific embodiment.

In some embodiments of the present disclosure, the bonding deviation area preserved during the bonding operation may be eliminated to reduce the width of the peripheral area by the design of the peripheral wires/or marks covered by the first or second coverings formed of metal nanowires.

Although the present disclosure is disclosed by the preceding embodiments, the present disclosure is not limited. Those skilled in the art should realize that such equivalent constructions do not depart from the spirit and scope of the present disclosure, and that they may make various alterations and modification herein without departing from the spirit and scope of the present disclosure. Therefore, the scope of the disclosure shall be defined by the following claims.

What is claimed is:

1. A touch panel comprising:
 a substrate;
 a plurality of peripheral wires disposed on the substrate, wherein:
  each of the plurality of peripheral wires has a sidewall and a top surface,
  a width of each of the plurality of peripheral wires is in a range from 5 μm to 20 μm, and
  a distance between adjacent peripheral wires of the plurality of peripheral wires is in a range from 5 μm to 20 μm;

a plurality of marks disposed on the substrate, each of the plurality of marks having a sidewall and a top surface;
a plurality of first coverings and a plurality of second coverings, wherein:
the plurality of first coverings is formed on the top surface of the plurality of peripheral wires,
the plurality of second coverings is formed on the top surface of the plurality of marks,
each of the plurality of first coverings and each of the plurality of second coverings comprises metal nanowires, and
the plurality of peripheral wires, the plurality of marks, the plurality of first coverings, and the plurality of second coverings are disposed in a peripheral area of the substrate; and
a touch sensing electrode disposed on a display area of the substrate, the touch sensing electrode electrically connecting the plurality of peripheral wires.

2. The touch panel as claimed in claim 1, further comprising a coating layer covering the touch sensing electrode, the plurality of first coverings, and the plurality of second coverings.

3. The touch panel as claimed in claim 2, further comprising non-conductive areas in the display area and the peripheral area respectively.

4. The touch panel as claimed in claim 3, wherein the non-conductive areas have a filling layer, and the filling layer and the coating layer are made of a same material.

5. The touch panel as claimed in claim 1, wherein each of the plurality of first coverings has a side surface, and the side surface and the sidewall of a corresponding peripheral wire of the plurality of peripheral wires form a common etched surface.

6. The touch panel as claimed in claim 5, wherein no metal nanowire protrudes out of the side surface.

7. The touch panel as claimed in claim 1, wherein each of the plurality of second coverings has a side surface, and the side surface and the sidewall of a corresponding mark of the plurality of marks form a common etched surface.

8. The touch panel as claimed in claim 7, wherein no metal nanowire protrudes out of the side surface.

9. The touch panel as claimed in claim 1, wherein the plurality of marks comprises bonding alignment marks.

10. The touch panel as claimed in claim 1, wherein the plurality of peripheral wires and the plurality of marks are made of a metal material, and the touch sensing electrode comprises the metal nanowires.

11. A sheet of touch sensors comprising:
a substrate, wherein a plurality of touch panels is disposed on the substrate, each of the plurality of touch panels comprising:
a plurality of peripheral wires disposed on the substrate, wherein:
each of the plurality of peripheral wires has a sidewall and a top surface
a width of each of the plurality of peripheral wires is in a range from 5 µm to 20 µm, and
a distance between adjacent peripheral wires of the plurality of peripheral wires is in a range from 5 µm to 20 µm;
a plurality of first coverings, wherein:
a first covering of the plurality of first coverings is formed on the top surface of a corresponding peripheral wire of the plurality of peripheral wires, and
the plurality of peripheral wires and the plurality of first coverings are disposed on a peripheral area; and
a touch sensing electrode disposed on a display area, wherein the touch sensing electrode is electrically connected with the plurality of peripheral wires;
a plurality of marks disposed on the substrate, wherein each of the plurality of marks has a sidewall and a top surface; and
a plurality of second coverings, wherein:
each of the plurality of second coverings is formed on the top surface of a corresponding mark of the plurality of marks, and
the plurality of first coverings and the plurality of second coverings comprise metal nanowires.

12. The sheet of touch sensors as claimed in claim 11, further comprising a coating layer covering the touch sensing electrode, the plurality of first coverings, and the plurality of second coverings.

13. The sheet of touch sensors as claimed in claim 12, further comprising non-conductive areas disposed on the display area and the peripheral area respectively.

14. The sheet of touch sensors as claimed in claim 13, wherein the non-conductive areas have a filling layer, and the filling layer and the coating layer are made of a same material.

15. The sheet of touch sensors as claimed in claim 11, wherein each of the plurality of first coverings has a side surface, and the side surface and the sidewall of the corresponding peripheral wire of the plurality of peripheral wires form a common etched surface.

16. The sheet of touch sensors as claimed in claim 15, wherein no metal nanowire protrudes out of the side surface.

17. The sheet of touch sensors as claimed in claim 11, wherein each of the plurality of second coverings has a side surface, and the side surface and the sidewall of the corresponding mark of the plurality of marks form a common etched surface.

18. The sheet of touch sensors as claimed in claim 17, wherein no metal nanowires protrude out of the side surface.

19. The sheet of touch sensors as claimed in claim 11, wherein the plurality of marks comprises bonding alignment marks disposed on the peripheral area of each of the plurality of touch panels, or the plurality of marks comprises cutting alignment marks disposed between neighboring touch panels of the plurality of touch panels, or the plurality of marks comprises alignment marks, direction marks, dimension marks or at least one of numeral or literal marks disposed on the substrate.

20. The sheet of touch sensors as claimed in claim 11, wherein the plurality of peripheral wires and the plurality of marks are made of a metal material, and the touch sensing electrode comprises the metal nanowires.

* * * * *